(12) United States Patent
Shimovetz

(10) Patent No.: US 6,413,050 B1
(45) Date of Patent: Jul. 2, 2002

(54) FRICTION DAMPED TURBINE BLADE AND METHOD

(75) Inventor: Ralph Shimovetz, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 3 days.

(21) Appl. No.: 09/592,502

(22) Filed: Jun. 12, 2000

(51) Int. Cl.⁷ ............................................... F04D 29/38
(52) U.S. Cl. ................. 416/223 R; 416/204 A
(58) Field of Search ........................ 416/223 R, 223 A, 416/204 R, 204 A

(56) References Cited

U.S. PATENT DOCUMENTS

| | | | |
|---|---|---|---|
| 2,715,011 A | * | 8/1955 | Schorner ................. 416/223 A |
| 2,947,066 A | * | 8/1960 | Tumavicus ................. 416/223 |
| 3,758,233 A | | 9/1973 | Cross et al. |
| 4,178,667 A | | 12/1979 | Stevens et al. |
| 5,369,882 A | | 12/1994 | Dietz et al. |
| 5,403,160 A | * | 4/1995 | You ....................... 416/223 A |
| 5,522,705 A | | 6/1996 | Elaini et al. |

\* cited by examiner

*Primary Examiner*—John Kwon
(74) *Attorney, Agent, or Firm*—Richard A. Lambert; Bobby D. Scearce; Thomas L. Kundert

(57) ABSTRACT

A friction damped turbine blade is disclosed. The turbine blade is formed of segments configured so as to form an assemblage corresponding to the airfoil shaped body. Each of the segments is in slidable contact with an adjacent segment. During turbine operation, the segments rub against one another due to the stresses placed on the blade, imparting frictional damping to the turbine blade.

8 Claims, 3 Drawing Sheets

FRICTION DAMPED TURBINE BLADE AND METHOD

RIGHTS OF THE GOVERNMENT

The invention described herein may be manufactured and used by or for the Government of the United States for all governmental purposes without the payment of any royalty.

BACKGROUND OF THE INVENTION

The present invention relates generally to airfoil blades for use in turbo machinery and, more specifically, to a turbine blade having improved friction damping characteristics.

The advantages of providing turbine blade damping are well known. During engine operation, turbine blades are exposed to a wide variety of stresses due to heat, oscillating airflow, etc., and correspondingly exhibit many adverse vibration modes and manners of operation. As a consequence, large stresses are induced in the blades and other elements of the turbine engine. These dynamic stresses can cause fatigue failures of the blade material and other components and, can even cause catastrophic failures of the engine and perhaps the aircraft itself. Thus, damping is introduced to offset these adverse consequences in order to reduce or even eliminate these stresses.

Various attempts have been made to date to provide damping to turbine engine internal components. For example, U.S. Pat. No. 5,522,705 to Elaini et al. discloses a friction damper for gas turbine engine blades utilizing a plate mounted underneath the outer shrouds of two adjacent airfoils. The friction generated between the plate and the shroud provides a degree of damping to reduce vibrations in the turbine blades. A disadvantage of systems like these is the increase of undesirable rotating mass in the turbine rotor as well as increased complexity of assembly of the engine.

Another attempt at turbine blade damping is found, for example, in U.S. Pat. No. 5,369,882 to Dietz et al. The Dietz apparatus includes a damping mechanism retained within the platform section of the turbine blade. The damping mechanism includes a damping wedge slidably received within a machined recess within the platform of the turbine blade. During operation, the damping wedge slides within the machined recess, frictionally engaging the walls of the recess, providing a degree of damping.

While damping systems such as these are somewhat effective, a limitation lies in the fact that the blade cannot be heat treated after final welding and correspondingly cannot be effectively stress relieved. Moreover, the damping action depends on the movement of the damping device which is dependent on turbine rotor speed. As is known, the undesirable stresses of operation can occur in very narrow ranges of operation and can even occur at different, perhaps unexpected, engine speeds based on transient operating conditions both internal as well as external to the engine.

U.S. Pat. No. 3,758,233 to Cross et al. is an example of the technique of covering the external surface of the turbine blade with a coating intended to provide damping to the turbine blade. A disadvantage to this technique is that the coating is not sufficiently durable for implementation into modern turbine engines because the coating has been found to craze or even crack off after several thermal cycles.

The problem of providing efficient turbine blade damping becomes compounded because as engine designs progress, the implementation of new low aspect ratio turbine blade designs for use either singly or within one-piece, manufactured blade and disk combinations called "blisks" has become more and more widespread. These low aspect ratio turbine blades enhance engine operation but have the disadvantage of exhibiting more complex modes of vibration and, they are thinner, rendering it more difficult to provide efficient damping and also permitting less physical room to incorporate damping mechanisms.

A need exists therefore for an improved friction damped turbine blade. Such a blade would exhibit improved friction damping during turbine operation, enhancing engine and blade performance as well as contributing to increased longevity.

SUMMARY OF THE INVENTION

Accordingly, it is a primary object of the present invention to provide a friction damped turbine blade overcoming the limitations and disadvantages of the prior art.

Another object of the present invention is to provide a friction damped turbine blade exhibiting improved friction damping during turbine operation, enhancing performance as well as blade longevity.

Another object of the present invention is to provide a friction damped turbine blade having a body formed of segments, each segment being in slidable contact with an adjacent segment for providing effective frictional damping.

Yet another object of the present invention to provide a friction damped turbine blade having a body formed of interlocking segments in slidable contact, for providing effective frictional damping while maintaining a continuous airfoil surface during turbine operation.

Still another object of the present invention is to provide a friction damped turbine blade having a body formed of slidably engaged segments including a friction reducing powder interposed between the segments for enhanced damping effect while reducing wear.

Additional objects, advantages and other novel features of the invention will be set forth, in part, in the description that follows and will, in part, become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects and in accordance with the purposes of the present invention as described herein, a friction damped turbine blade incorporates a body formed of at least two segments in slidable contact with each adjacent segment. During turbine operation, the segments slidably engage one another, providing enhanced turbine blade damping, thereby enhancing turbine engine operation as well as enhancing longevity.

According to an important aspect of the present invention, the sliding action of the adjacent segments provides frictional damping to the turbine blade. Depending on turbine blade configuration, mass distribution requirements, etc., several segments can be utilized to form the body of the turbine blade. Advantageously, this method of providing frictional damping introduces damping into the blade while avoiding the introduction of large stress concentrations in the blade, enhancing blade longevity as well as turbine engine reliability.

BRIEF DESCRIPTION OF THE DRAWING

The accompanying drawing incorporated in and forming a part of the specification, illustrates several aspects of the present invention and together with the description serves to explain the principles of the invention. In the drawing.

DESCRIPTION OF THE INVENTION

Figure 3:
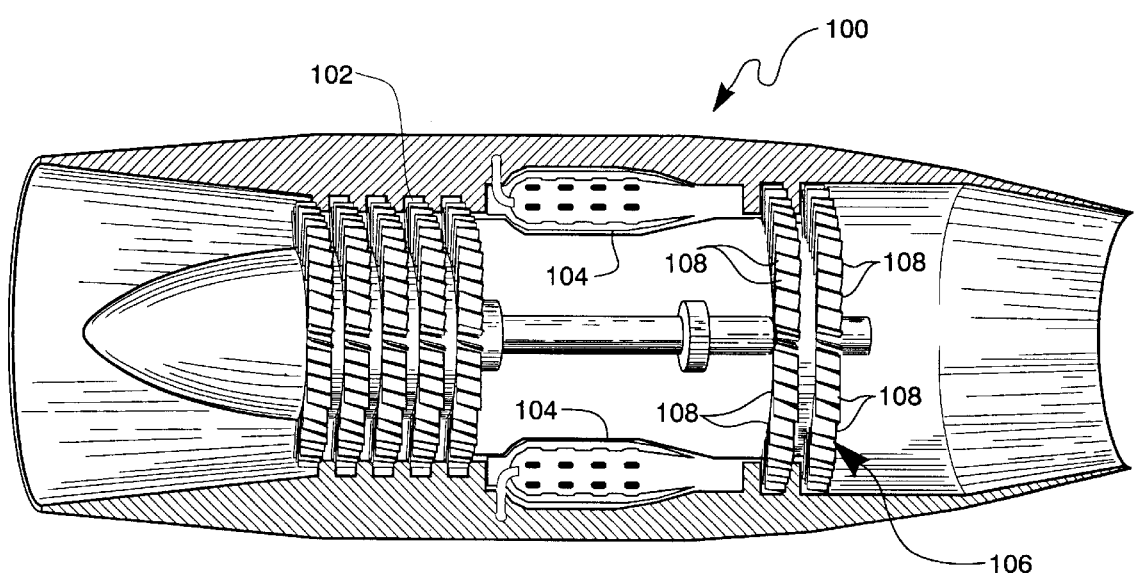
FIG. 3 is a cross sectional view of a representative gas turbine engine.

Reference is made to the drawing figures showing the friction damped turbine blade of the present invention. As is known in the art, and as shown in FIG. 3, a typical gas turbine engine 100 includes a compressor section 102 which receives atmospheric air and pressurizes it prior to admission into the combustion chambers 104. The pressurized air within the combustion chambers 104 is ignited and further directed into the turbine section 106. The turbine section 106, powered by the expansion of the combustion gasses, provides the desired thrust, as well as the motive force for the compressor section 102.

Figure 4:
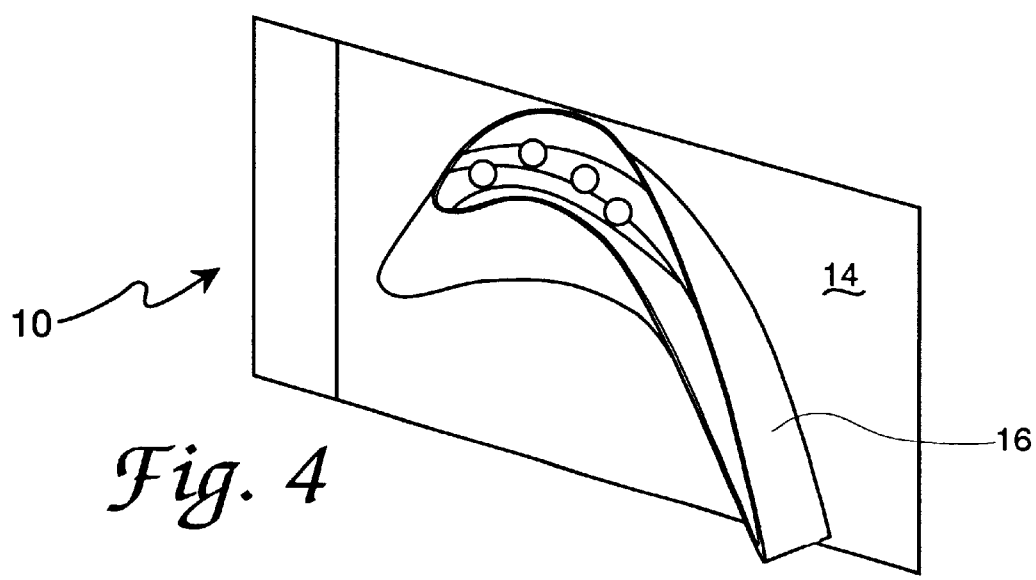
FIG. 4 is a plan view of the friction damped turbine blade of the present invention; and, FIG. 5 is an elevational view of the friction damped turbine blade of the present invention.

As shown, the turbine section 106 typically includes one or more rows of turbine blades 108. As shown in FIG. 4, turbine blades typically have an airfoil shape. They are attached onto a rotatable disk in rows or stages. The turbine blades, by nature of their airfoil shape, receive the hot combustion gasses and correspondingly impart a rotational force to the disk and turbine rotor for powering the engine. Modern high output turbine engines typically run at 10,000 revolutions per minute or higher in order to produce the desired thrust required for sustaining high performance aircraft in flight.

As can be appreciated, the operating environment encountered by turbine blades in a modern turbine engine is severe, due, not only to the high operating temperatures but to the extraordinarily high rotor speeds encountered. The physical stresses imparted to the turbine blades by the heat and rotational speed are extreme and are a major factor contributing to high maintenance costs as well as premature blade failure.

Figure 5:
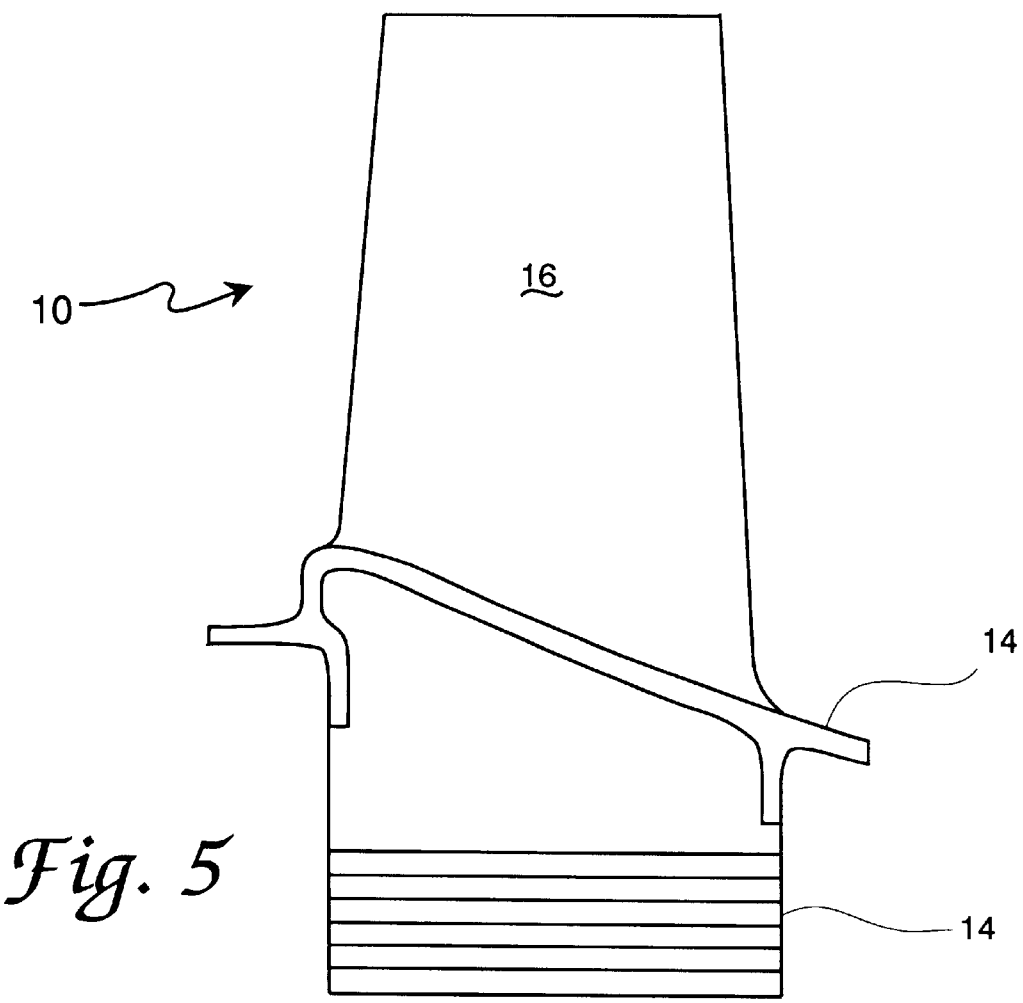

Reference is now made to FIGS. 4 and 5 wherein the friction damped turbine blade 10 of the present invention is illustrated. As shown, the turbine blade 10 includes a root 12 adapted for mounting on the rotatable disk described above. The root 12 has an upper platform 14 upon which an airfoil shaped body 16 is mounted.

Figure 1:
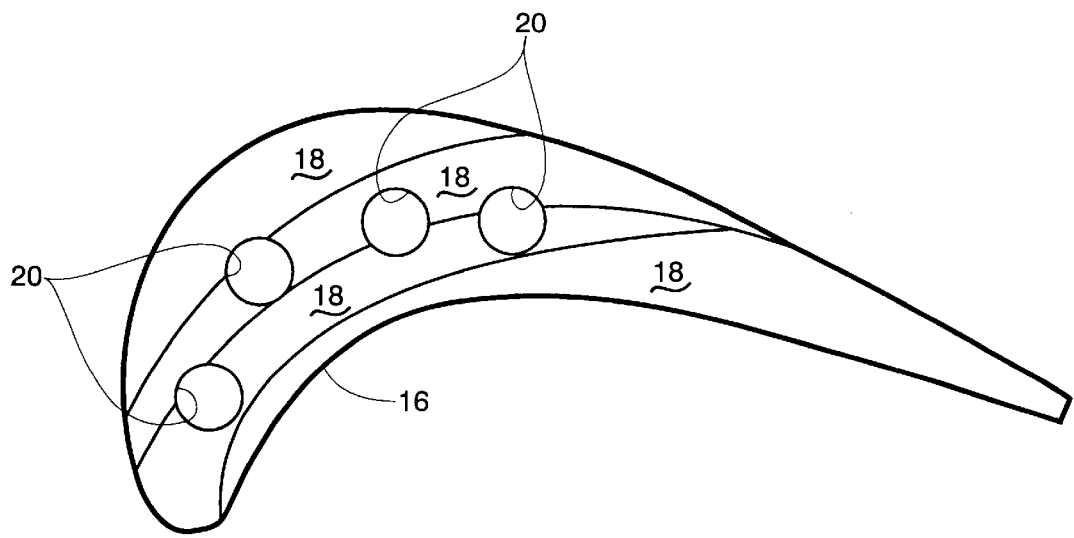
FIG. 1 is a cross sectional view of the friction damped turbine blade of the present invention.
Figure 2:
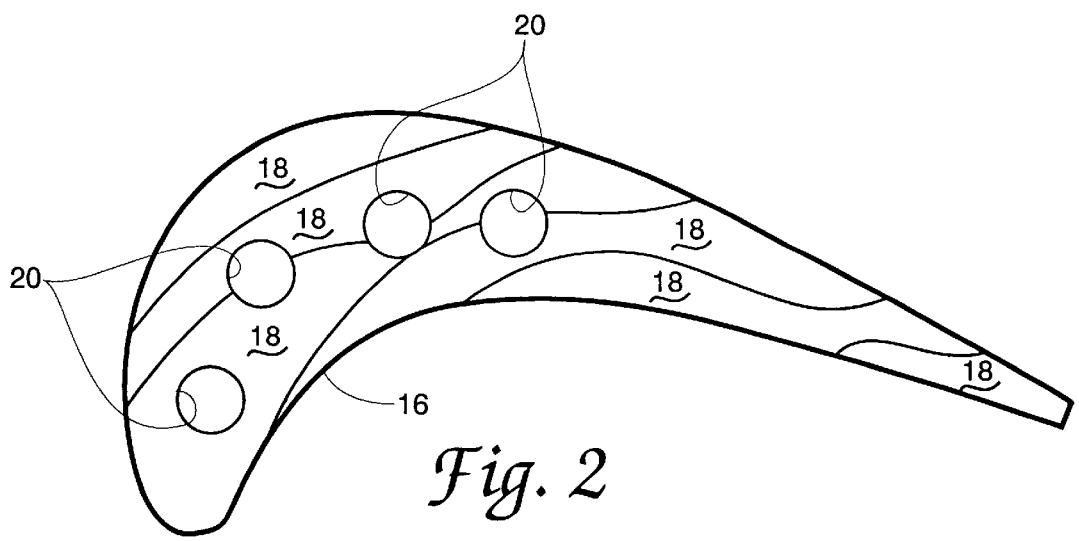
FIG. 2 is a cross sectional view of the friction damped turbine blade of the present invention showing the segments in an interlocking relationship.

As shown in FIGS. 1 and 2, the airfoil shaped body 16 is formed of at least two segments 18 as shown. The segments 18 are configured so as to form an assemblage corresponding to the airfoil shaped body 16. According to the method of the present invention, the segments 18 are assembled to form the airfoil shaped body 16 and the airfoil shaped body 16 is then attached to the platform 14, thereby completing the turbine blade 10.

Advantageously and according to an important aspect of the present invention, each of the segments 18 is in slidable contact with an adjacent segment 18. This slidable contact relationship of the segments 18 enables a frictional damping to be imparted to the turbine blade 10 during operation. More specifically, the segments 18 rub against one another due to the stresses placed on the blade 10 encountered during turbine engine operation. For example, these stresses can be manifest in the form of bending and torsion resulting from dynamic oscillations of the turbine blade. As the segments 18 move relative to one another, frictional losses are imparted to the blade 10, having the net result of providing frictional damping, reducing the stress below that of a solid blade or undamped component.

The present invention has particular utility for use in blisks, one piece manufactured disk and blade combinations. Blisks are coming into widespread use and are becoming the preferred method of manufacture on the newer high performance turbine engines. The blisk, while presenting advantages such as engine performance and ease of manufacture, has an inherent disadvantage in that it provides less damping than the traditional built-up turbine rotor wherein each blade is manufactured separately and installed on the disk. Advantageously, the friction damped turbine blade 10 of the present invention can be incorporated into blisks to overcome the inherent disadvantage of reduced damping found in the conventional blisk by restoring the desired damping thereto.

It is another advantage of the present invention that the number of segments 18, as well as shape, can be varied in order to fine tune the application according to turbine engine, size, power, anticipated operating conditions, etc. In this way, localized, frictional damping can be imparted to the blade 10 at precise locations by the configuring the number, size and shape of the segments 18.

As shown in FIG. 2, some or all of the segments 18 can be configured to form an interlocking relationship. This interlocking relationship of the segments 18 causes the segments to press together with increasing engine speed. This interlocking relationship serves to maintain the airfoil shape of the airfoil shaped body 16, yet allows the desired frictional damping between segments. As can be appreciated, the interlocking segments and non-interlocking segments can be intermixed to modify the performance characteristics of the turbine blade 10. In this way, the turbine blade 10 of the present invention can be adapted for use in a wide variety of turbine engine applications.

As is known in the art, turbine blades are often air cooled and include one or more labyrinthine cooling passages for directing cooling air throughout the blade. As shown in FIGS. 1 and 2, these cooling passages 20 are incorporated into the blade material and are located so as to direct a supply of cooling air to the hotter areas of the blade 10. In general, the incorporation of cooling passages in prior art turbine blades can be somewhat problematic due to manufacturing difficulties. Advantageously, cooling passages 20 can be readily incorporated into the turbine blade 10 of the present invention by appropriate machining of the specific segments 18 in which the cooling passage is intended to traverse. In this way, when the airfoil shaped body 16 is assembled and attached to the platform, the cooling passages 20 are automatically incorporated.

In certain situations, depending on turbine engine design parameters, it may be desirable to introduce a sufficient quantity of friction reducing powder (not shown) between the segments during assembly. This would provide a fine tuning effect to the frictional damping between the segments 18. In this way, for example, high wear areas, as defined by engine and blade design parameters, could be accounted for, and the friction reducing powder would serve to reduce frictional contact in those areas. This would help maximize turbine blade longevity by the avoidance of undesirably high localized wear patterns. A representative choice of friction reducing powder would be titanium dioxide, molybdenum disulfide, nickel or carbon graphite. In the preferred embodiment, the friction reducing powder is titanium dioxide. In order to assure a continuous supply of friction reducing powder in areas where powder attrition could result, a reservoir for receiving and dispensing powder (not shown) could be formed in the platform of the blade.

In summary, numerous benefits have been described from utilizing the principles of the present invention. In particular, the friction damped turbine blade 10 and method of the present invention incorporates an airfoil shaped body 16 formed of at least two segments 18. The segments 18 are fabricated in such a manner that they form an assemblage corresponding to the airfoil shaped body. The segments 18 are assembled and the resultant airfoil shaped body 16 is attached onto the platform 14. Each of the segments 18 is in slidable contact with an adjacent segment 18. During turbine operation, as the segments 18 move relative to one another, frictional losses are imparted to the blade 10, having the net result of providing frictional damping, advantageously reducing the stress below that of a solid blade or undamped component.

The foregoing description of the preferred embodiment has been presented for purposes of illustration and description. It is not intended to be exhaustive or to limit the invention to the precise form disclosed. Obvious modifications or variations are possible in light of the above teachings. For example, the teachings of the present invention would be applicable to other rotatable components such as compressor blades. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A turbine blade, comprising:

an airfoil shaped body, said body having a convex side, a concave side, a leading edge and a trailing edge;

said body being formed of at least two segments, each of said segments being in slidable, frictional damping contact with an adjacent segment.

2. The turbine blade of claim 1 further including a sufficient quantity of friction reducing powder interposed between said segments.

3. The turbine blade of claim 2 wherein said friction reducing powder is selected from titanium dioxide, molybdenum disulfide, nickel and carbon graphite.

4. The turbine blade of claim 3 wherein said friction reducing powder is titanium dioxide.

5. The turbine blade of claim 1 wherein at least two adjacent of said segments are in an interlocking relationship.

6. A turbine blade, comprising:

an airfoil shaped body, said body having a convex side, a concave side, a leading edge and a trailing edge;

said body being formed of at least two segments, each of said segments being in slidable contact with an adjacent segment; and, a sufficient quantity of friction reducing powder interposed between said segments.

7. The turbine blade of claim 6 wherein said friction reducing powder is selected from titanium dioxide, molybdenum disulfide, nickel and carbon graphite.

8. The turbine blade of claim 7 wherein said friction reducing powder is titanium dioxide.

* * * * *